United States Patent [19]

Page et al.

[11] Patent Number: 4,768,997

[45] Date of Patent: Sep. 6, 1988

[54] BELT DRIVE SYSTEM FOR DUAL INPUT TRANSMISSIONS/TRANSAXLES

[75] Inventors: Rocky H. Page, Tecumseh, Mich.; Edward J. Koscho, deceased, late of Tecumseh, Mich., by Mary E. Koscho, legal representative

[73] Assignee: Tecumseh Products Company, Tecumseh, Mich.

[21] Appl. No.: 24,341

[22] Filed: Mar. 10, 1987

[51] Int. Cl.⁴ .............................. F16H 7/02; F16H 9/04
[52] U.S. Cl. ............................................. 474/84; 474/27; 474/29; 74/689
[58] Field of Search ....................... 474/69, 70, 75, 84, 474/85, 88, 89, 101, 109, 111, 133, 135, 27, 29; 74/689

[56] References Cited

U.S. PATENT DOCUMENTS

| | | | |
|---|---|---|---|
| 114,341 | 5/1871 | Randolph | 474/85 X |
| 588,856 | 8/1897 | de Dion et al. | 74/689 |
| 899,741 | 9/1908 | Lane et al. | 474/85 |
| 1,426,670 | 8/1922 | Pollard | 74/711 |
| 1,543,420 | 6/1925 | Cooper | 74/689 |
| 1,623,724 | 4/1927 | Harry | 74/695 X |
| 2,000,593 | 5/1935 | Happel | 74/689 |
| 2,047,840 | 7/1936 | Twomley | 474/26 X |
| 2,161,894 | 6/1939 | Bishop | 74/689 |

(List continued on next page.)

FOREIGN PATENT DOCUMENTS

| | | |
|---|---|---|
| 185184 | 7/1955 | Austria . |
| 520470 | 6/1953 | Belgium . |
| 6950 | 10/1955 | Fed. Rep. of Germany . |
| 2518113 | 2/1977 | Fed. Rep. of Germany . |
| 2733294 | 6/1980 | Fed. Rep. of Germany . |
| 3020510 | 12/1981 | Fed. Rep. of Germany . |
| 3226823 | 2/1984 | Fed. Rep. of Germany . |
| 1362015 | 9/1964 | France . |
| 1544765 | 9/1968 | France . |
| 372632 | 2/1940 | Italy . |
| 7504032 | 4/1975 | Netherlands . |
| 250459 | 8/1947 | Switzerland . |
| 689262 | 3/1958 | United Kingdom . |

OTHER PUBLICATIONS

"Presentation & Demonstration-Constant Horsepower Variable Speed Reversing Transmission", and excerpts from U.S. Pat. No. 3,924,489, Diamond Seven, Inc., Oct. 20, 1976.

"Die Planetenrad-Umlaufradergetriebe", Hugo Klein VDI, Carl Hanser Verlag Munchen, 1962.

"On-The-Go Infinite Shift Transaxle for Lawn and Garden Equipment", copyright 1971, Salsbury Division, Instrument Systems Corporation, Los Angeles, CA 90001.

Catalog, Peerless Gear Division, Tecumseh Products Company, Tecumseh, MI.

Brochure, "Peerless-May Variator", Jul. 1986.

Primary Examiner—Stephen J. Novosad
Assistant Examiner—Thuy M. Bui
Attorney, Agent, or Firm—Price, Heneveld, Cooper, DeWitt & Litton

[57] ABSTRACT

A two belt drive system is disclosed for lawn and garden tractors and other vehicles especially of the type including a variable speed transmission/transaxle having a constant speed rotational input, a variable speed rotational input, and an output speed dependent on the rotational speed of the variable input. A first drive belt is mounted for rotation in one direction on an engine drive pulley, a first pulley on one of the transmission/transaxle inputs, and one pulley of a variable diameter pulley assembly. A second drive belt is mounted for rotation in the same direction as the first belt on a second pulley on the other transmission/transaxle input and the other pulley of the variable pulley assembly. Shifting the position of the variable pulley assembly with a hand control changes the belt receiving diameters of the variator pulleys such that the rotational speed of the second drive belt, second pulley, transmission/transaxle output, and resulting ground speed of the tractor are all adjustable with the hand control while the engine drives the first drive belt at a constant rotational speed.

43 Claims, 5 Drawing Sheets

U.S. PATENT DOCUMENTS

| | | | |
|---|---|---|---|
| 2,179,933 | 11/1939 | Heyer | 474/26 X |
| 2,245,392 | 6/1941 | Drill | 74/689 |
| 2,332,838 | 10/1943 | Borgward | 74/689 |
| 2,359,526 | 10/1944 | Locke | 74/689 |
| 2,360,076 | 10/1944 | Shaw | 74/689 |
| 2,410,915 | 11/1946 | Willmott | 74/689 |
| 2,478,870 | 8/1949 | Heyer | 474/29 |
| 2,546,869 | 3/1951 | Przybylski | 74/689 X |
| 2,578,650 | 12/1951 | Wright | 74/689 |
| 2,745,297 | 5/1956 | Andrus | 74/689 |
| 2,808,738 | 10/1957 | Bartell | 74/701 |
| 2,932,216 | 4/1960 | Schou | 74/689 |
| 2,933,952 | 4/1960 | Schou | 74/689 |
| 3,003,574 | 10/1961 | Strunk | 474/5 X |
| 3,015,237 | 1/1962 | Musgrave | 474/33 |
| 3,038,288 | 6/1962 | Deptula et al. | 56/11.6 |
| 3,040,601 | 6/1962 | Lewis | 74/740 |
| 3,059,397 | 10/1962 | Anderson et al. | 56/11.1 |
| 3,091,132 | 5/1963 | Mayfield et al. | 74/689 |
| 3,131,581 | 5/1964 | Graybill | 74/740 |
| 3,245,085 | 4/1966 | Lewis | 74/665 GB |
| 3,251,243 | 5/1966 | Kress | 74/689 |
| 3,266,590 | 8/1966 | Hungerford | 74/769 X |
| 3,340,749 | 9/1967 | Magg et al. | 74/689 |
| 3,370,485 | 2/1968 | Carawan | 74/689 |
| 3,375,733 | 4/1968 | Browning | 74/689 |
| 3,406,592 | 10/1968 | von Kaler | 74/710 |
| 3,481,221 | 12/1969 | Gaskins | 74/689 |
| 3,494,210 | 2/1970 | Ashton et al. | 474/27 |
| 3,503,279 | 3/1970 | Sievert et al. | 74/689 |
| 3,538,789 | 11/1970 | Quick et al. | 474/29 X |
| 3,583,535 | 6/1971 | Plamper | 474/27 X |
| 3,628,315 | 12/1971 | Bartholomew | 56/11.6 X |
| 3,670,594 | 6/1972 | Roper | 74/689 |
| 3,678,786 | 7/1972 | Szekely | 74/782 |
| 3,715,928 | 2/1973 | Case et al. | 474/29 X |
| 3,731,557 | 5/1973 | Kamlukin et al. | 474/5 X |
| 3,759,342 | 9/1973 | Plamper | 474/27 X |
| 3,766,722 | 10/1973 | Kamlukin et al. | 56/11.6 |
| 3,777,585 | 12/1973 | Plamper | 474/27 |
| 3,812,735 | 5/1974 | von Kaler et al. | 74/371 |
| 3,850,050 | 11/1974 | Lemmens | 74/689 |
| 3,861,485 | 1/1975 | Busch | 74/689 X |
| 3,863,514 | 2/1975 | Jensen | 474/33 X |
| 3,938,400 | 2/1976 | Konyha | 474/27 X |
| 3,999,444 | 12/1976 | Willman | 474/29 X |
| 4,024,776 | 5/1977 | Stinson | 74/689 |
| 4,086,826 | 5/1978 | von Kaler | 74/713 |
| 4,103,566 | 8/1978 | von Kaler et al. | 74/701 |
| 4,128,017 | 12/1978 | Clarke | 474/27 X |
| 4,132,121 | 1/1979 | Clarke | 474/27 |
| 4,176,560 | 12/1979 | Clarke | 474/27 |
| 4,212,210 | 7/1980 | von Kaler et al. | 74/375 |
| 4,224,839 | 9/1980 | von Kaler | 74/701 |
| 4,232,569 | 11/1980 | Hauser et al. | 74/701 |
| 4,241,618 | 12/1980 | Smirl | 74/689 X |
| 4,322,934 | 4/1982 | Doi | 474/25 X |
| 4,329,888 | 5/1982 | Falzoni | 74/689 |
| 4,335,629 | 6/1982 | Falzoni | 74/689 |
| 4,480,501 | 11/1984 | von Kaler | 74/606 R X |
| 4,484,491 | 11/1984 | Cocking | 74/606 R |
| 4,589,303 | 5/1986 | Roberts | 74/689 |

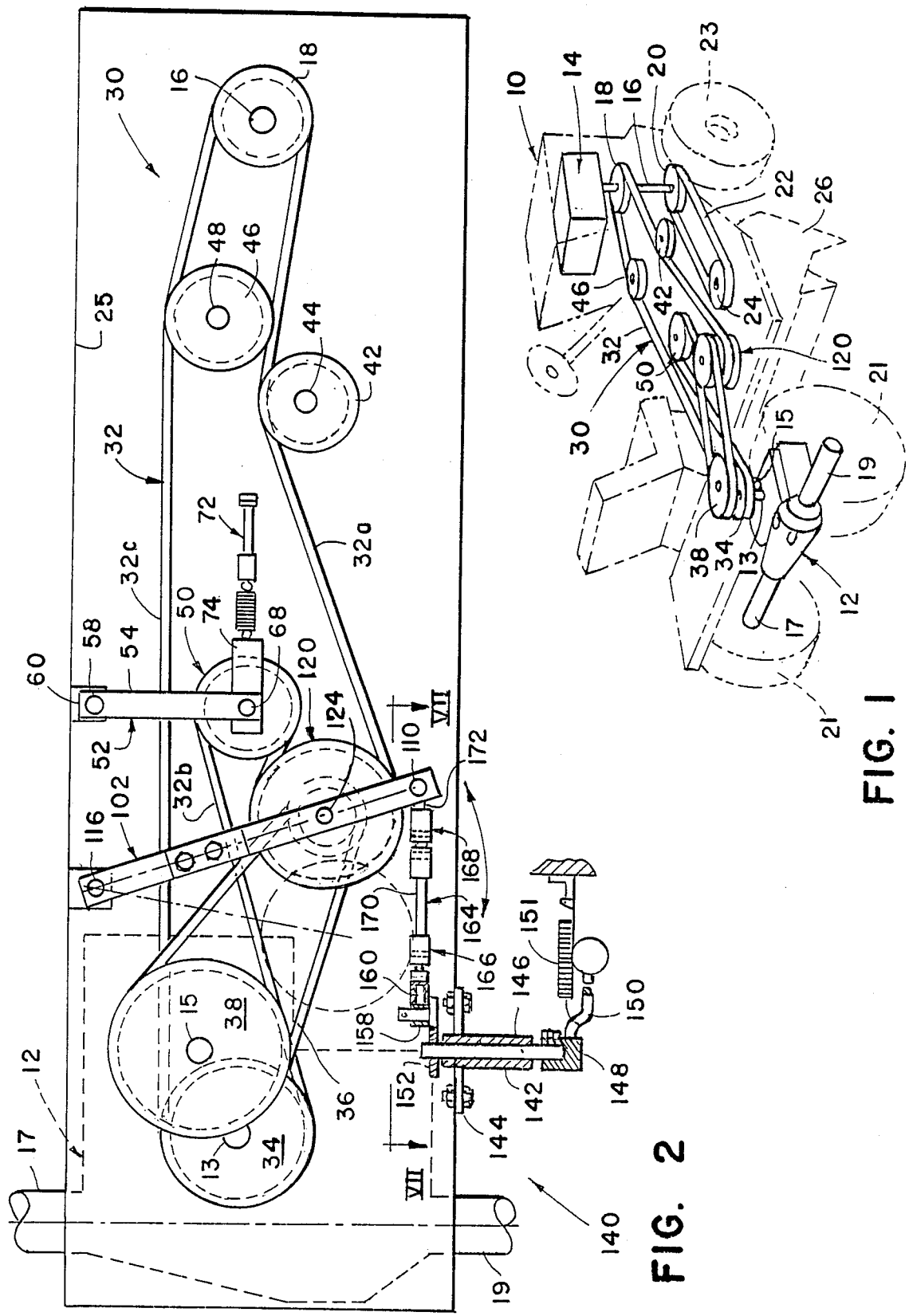

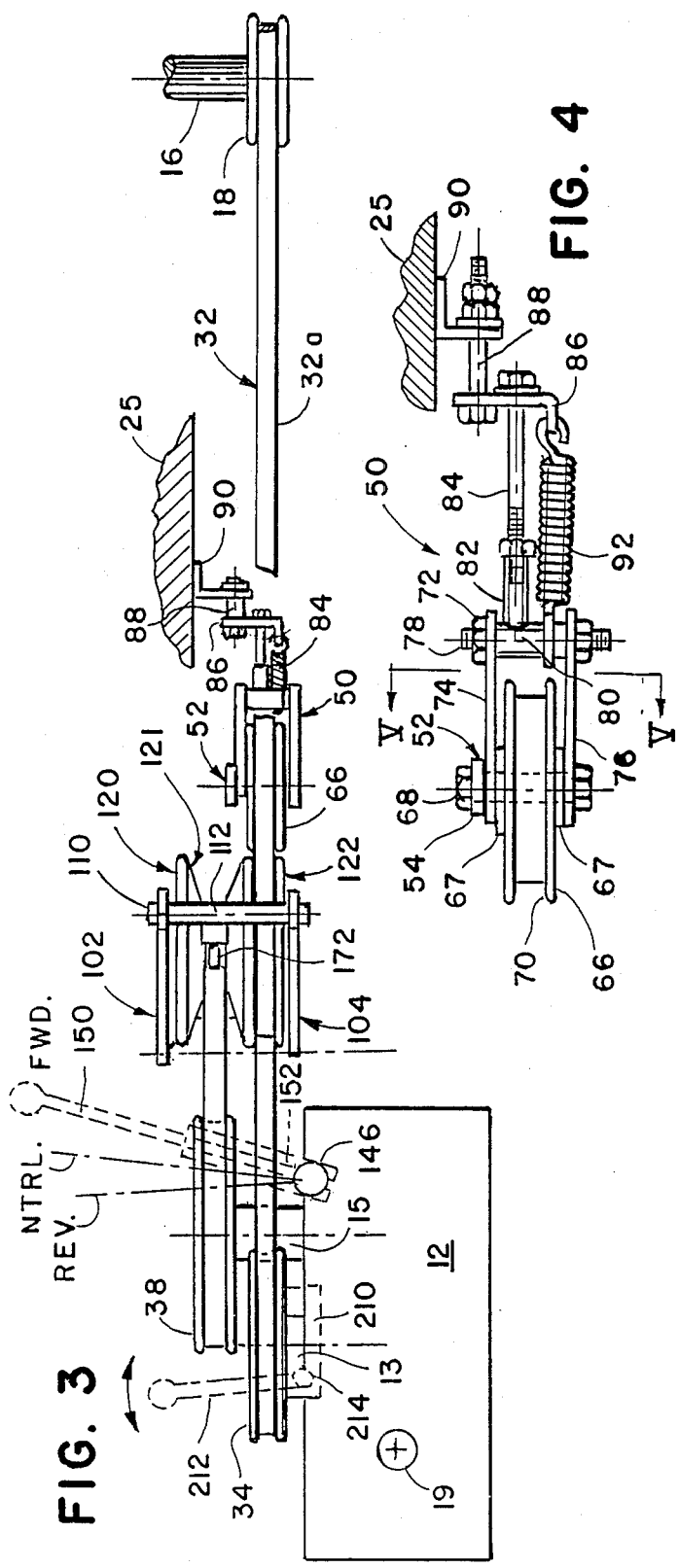

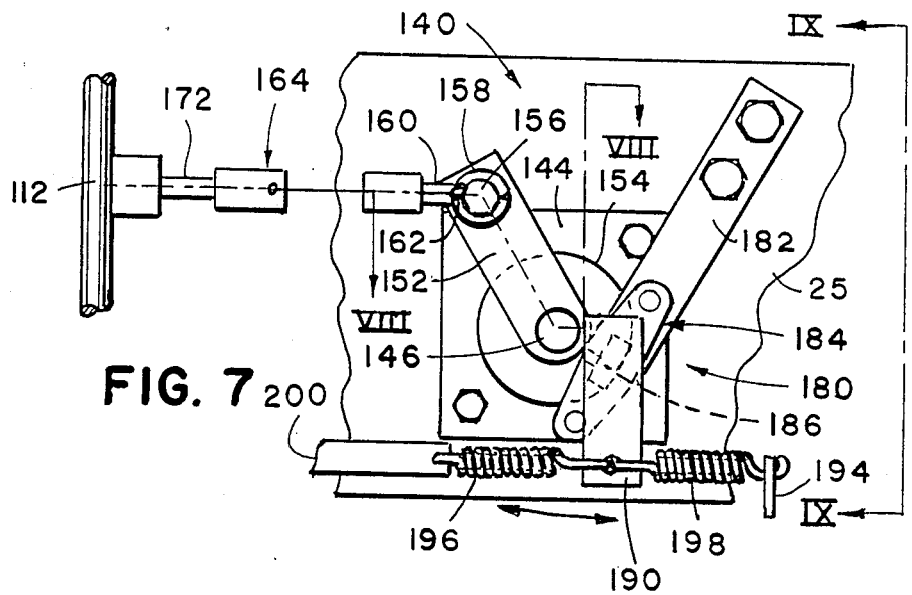
FIG. 7
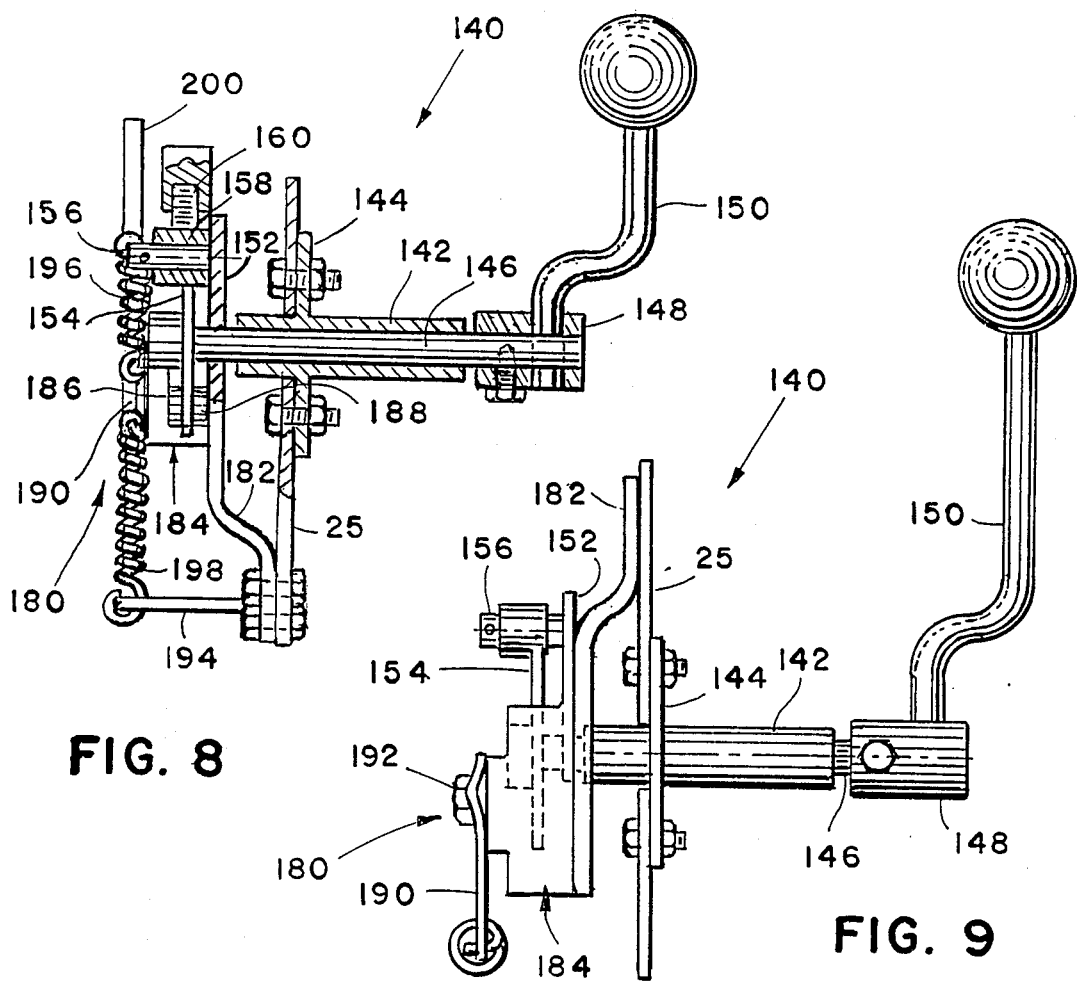
FIG. 8
FIG. 9

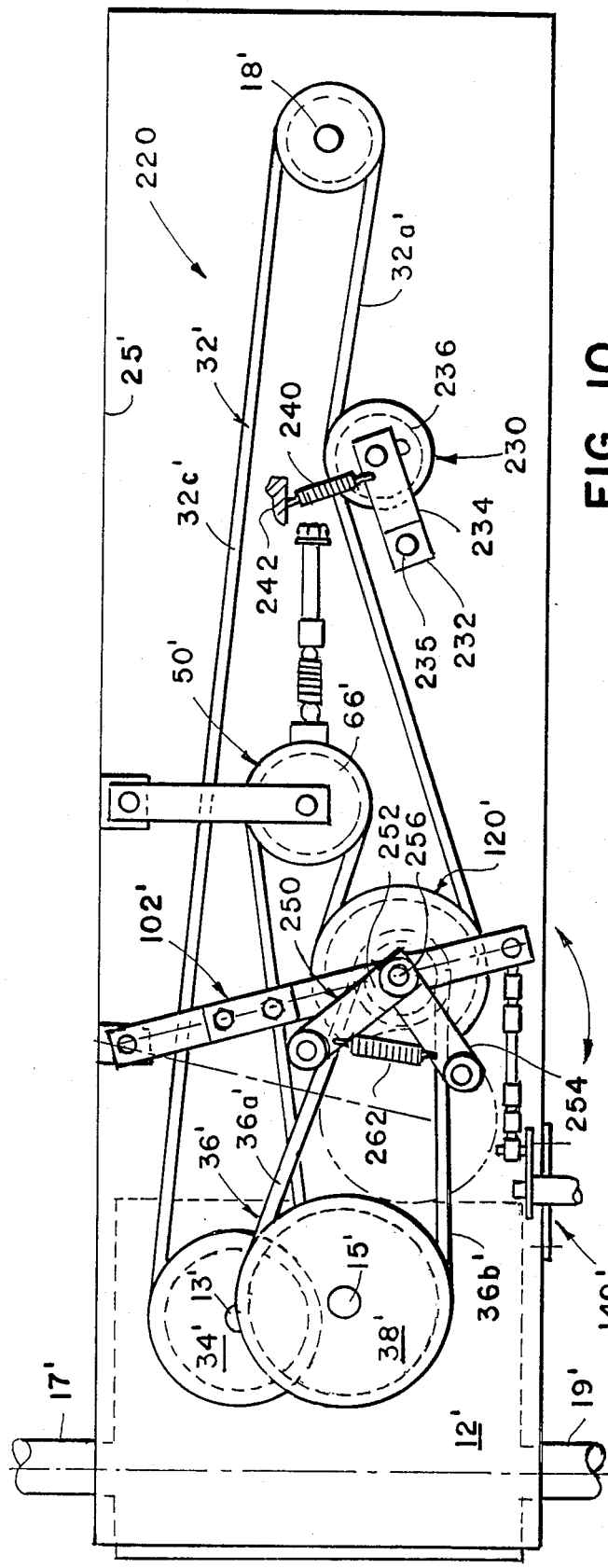
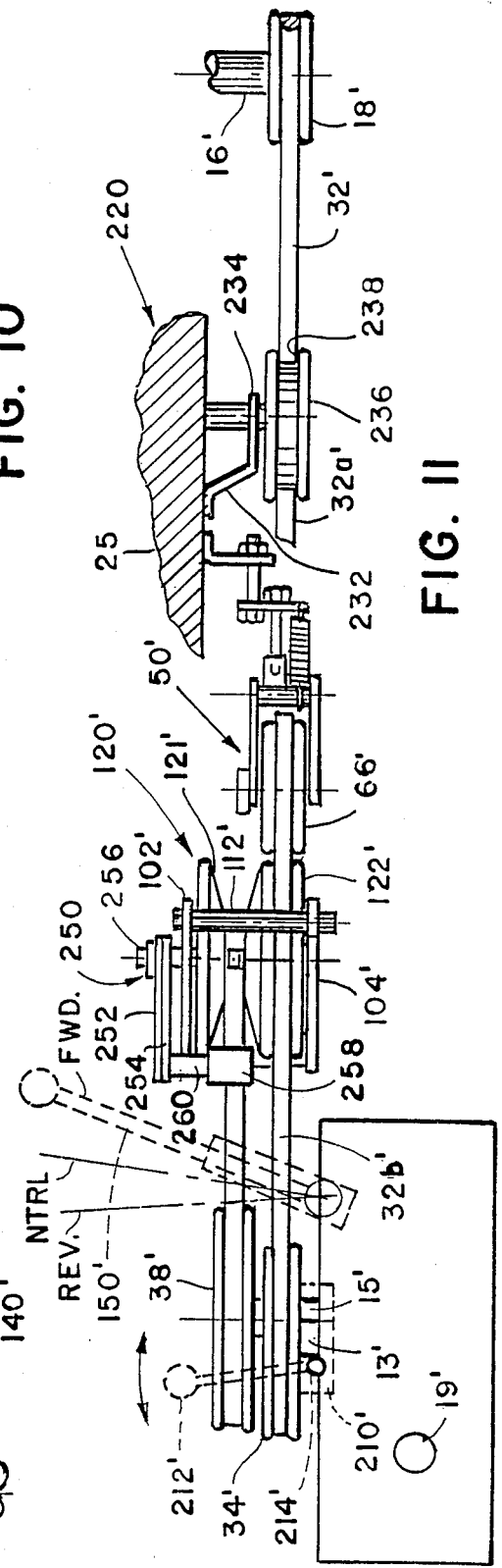
FIG. 10
FIG. 11

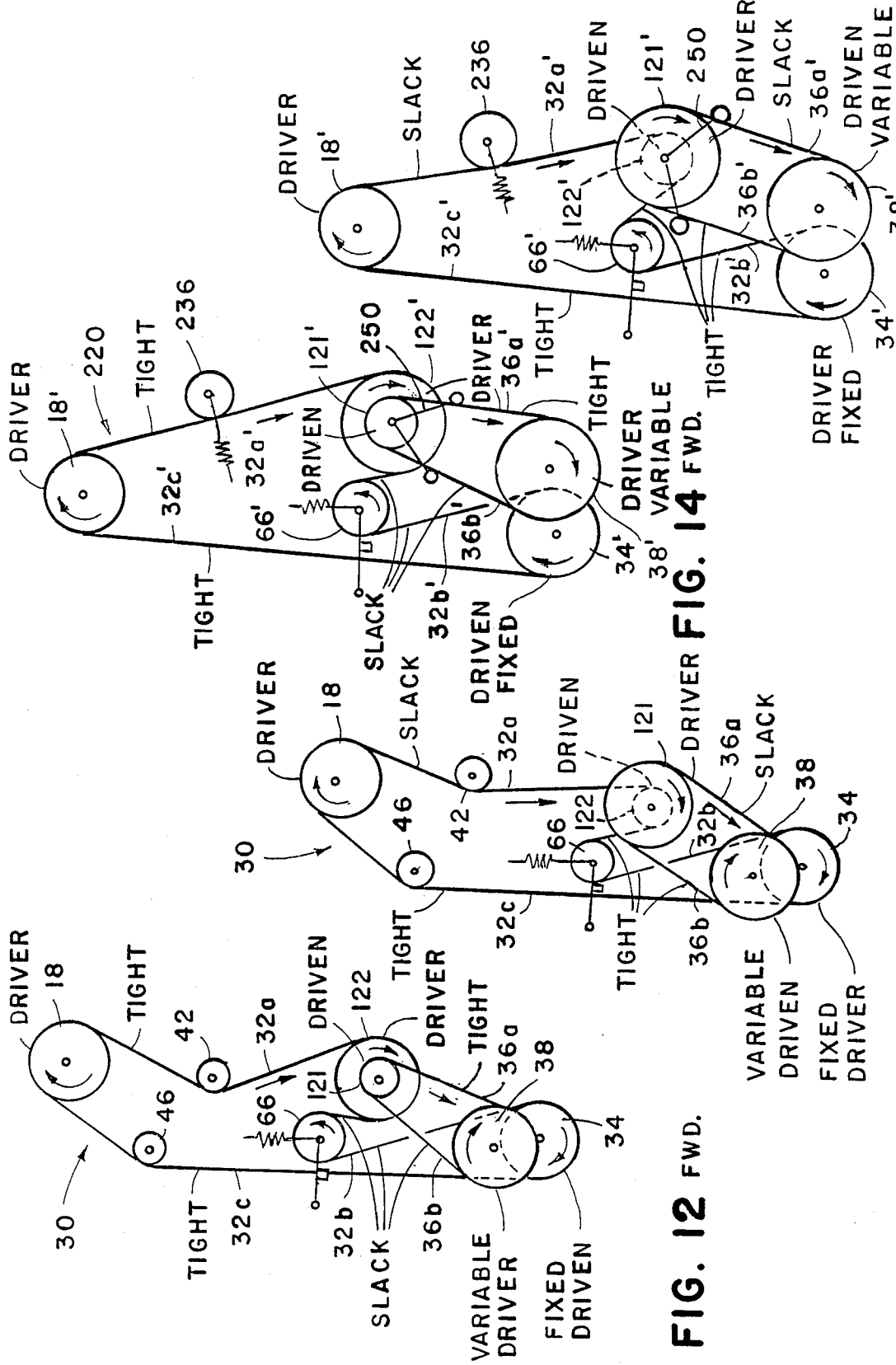

BELT DRIVE SYSTEM FOR DUAL INPUT TRANSMISSIONS/TRANSAXLES

BACKGROUND OF THE INVENTION

This invention relates to belt drive systems for vehicles and, more particularly, to a two belt drive system for lawn and garden tractors and other vehicles equipped with variable speed transmission/transaxle assemblies which include two rotational inputs and allow variation in ground speed while maintaining a constant engine drive speed.

Recent designs of variable speed transmission/transaxle assemblies for use with lawn and garden tractors and other small vehicles allow tractor ground speed to be varied from forward through neutral or zero output and reverse while maintaining tractor engine speed at a constant rate. Maintenance of constant engine speed enables constant speed rotation of mower blades for better, more effective cutting while prolonging engine life by reducing wear on the engine. One such variable speed transmission/transaxle is disclosed in co-pending, commonly assigned U.S. patent application Ser. No. 06/759,679 filed July 29, 1985, entitled VARIABLE SPEED TRANSAXLE ASSEMBLY invented by Roland von Kaler and Rocky H. Page, now U.S. Pat. No. 4,726,256. Such transaxle incorporates a planetary gear assembly requiring separate, continuously operated, rotational drive inputs. One is driven at a constant rotational speed. The rotational speed of the other is varied to change the ultimate output speed of the transmission/transaxle and thus the tractor gound speed. In order to operate such a transmission/transaxle, while maintaining a constant engine speed, a three belt drive system is disclosed in Ser. No. 06/759,679 including two belts which are driven directly by the engine drive shaft and a third belt which is driven by one of the two drive belts through a variable pulley assembly.

The above type of three belt drive system is relatively expensive because of the inclusion of the number of belts and necessary supporting pulley components, tensioners and the like. Use of such a three belt system for both pretensioned or taut belt systems and passive belt systems, which operate with less tension on the belts but incorporate additional tensioning elements for slack take-up, has been difficult because of the necessity of tensioning or taking up the slack in three separate belts. With the normal wear encountered in all belt systems, replacement of three separate belts is more time consuming, expensive and difficult, especially if the system is pretensioned or taut where loads on the belts are relatively high.

An additional factor which must be considered in operating a variable speed transmission/transaxle assembly of the type described in U.S. Pat. No. 4,726,256 above is the control of the belt system to allow return of the system to neutral or zero transmission output when the vehicle brakes are applied. Also, provision must be made to allow pushing or movement of the tractor when the engine is shut off. Each of these operations is significant in a variable speed, planetary type transmission where gearing is constantly engaged and belt drives are constantly operating even when the transmission output is zero or neutral. Since the belts in such a drive system are always in driving tension in order to constantly rotate both inputs of the transmission/transaxle, movement of the vehicle when the engine is off would typically require rotation of all the drive belts against the compression of the engine cylinders.

Accordingly, the need was apparent for a reliable, less expensive belt drive system for lawn and garden tractors and other vehicles of the type incorporating planetary and other variable speed, dual input transmission/transaxle assemblies and adequate for use in both pretensioned or taut belt systems and in passive belt systems. The system must operate in both heavy and light load ranges, allow control for return to neutral or zero output when vehicle brakes are applied, and allow pushing or movement of the vehicle when the engine is off and the belts are not rotating. The present belt drive system was devised in recognition of and as a solution for these requirements.

SUMMARY OF THE INVENTION

Accordingly, the present invention provides a belt drive system for lawn and garden tractors and other vehicles incorporating two belts which are continuously rotated in the same direction to provide both constant speed and variable speed rotational input for a variable speed transmission/transaxle assembly requiring dual drive inputs. The invention is adjustable using a single hand control to vary the rotational speed of one drive belt in response to the adjustment of a variable diameter pulley assembly rotated at a constant rotational speed by the other drive belt.

In one form, the invention is a belt drive system for use with variable speed vehicular transmission/transaxle assemblies including a driving belt pulley adapted for mounting on an engine drive shaft, a first driven belt pulley adapted for mounting on the first input shaft of the transmission/transaxle and a second driven belt pulley adapted for mounting on the second input shaft of the transmission/transaxle assembly. A first drive belt is mounted on the driving pulley and the first driven pulley for rotating the first driven pulley in a predetermined rotational direction. A second drive belt is mounted on the second driven pulley. A variable diameter pulley means is included engaging the first and second drive belts for changing the rotational speed of the second drive belt and second driven pulley in response to a change in the diameter at which the first drive belt contacts the variable pulley means. Thus, when the first drive belt and first driven pulley are rotated at a constant speed, the rotational speed of the second drive belt and second driven pulley may be varied to change the output speed of the transmission/transaxle by changing the diameter of the variable diameter pulley means.

Preferably, the variable diameter pulley means is a variator pulley assembly having a pair of rotatably mounted belt pulleys and means for changing the belt receiving diameter of one of the pulleys in response to a change in the belt receiving diameter of the other pulley. When one pulley diameter is increased, the other is decreased correspondingly.

In other aspects, the invention includes a belt tensioner for maintaining the drive belt which engages the drive pulley and the first driven pulley at a predetermined tension. In a pretensioned or taut belt system, this belt tensioner is used to apply the preset, relatively high tension load on both belts without the need for additional tensioning elements. In a passive belt system, this belt tensioner takes up initial slack in all segments of the first and second drive belts, while other tensioning elements including idler pulleys or wheels are used to take up slack at various operational times in other segments of the first and second drive belts.

The variator pulley assembly itself is mounted on a pivotable arm for movement in a first direction to decrease the diameter of the pulley engaging the first drive belt and simultaneously increase the diameter of the other pulley, and in a second direction to decrease the diameter of the one pulley and simultaneously increase the diameter of the other pulley. The position of the variator and pivot arm may be controlled with a hand operated rotatable shaft assembly and universal linkage. A brake is provided to releasably hold the hand operated shaft in a predetermined rotational position so that appropriate transmission output speed can be maintained. When the brake is released, the shaft and variator may return to the neutral position.

In yet another aspect of the invention, means are provided for disengaging at least one of the three driving and driven pulleys from its respective shaft to allow rotation of the axle in the transmission/transaxle without rotation against the compression of the tractor engine such that the tractor or other vehicle may be moved over the ground while the engine is not operating. Such means, which may be a dog type or friction type clutch, also enables return of the drive belts and variable pulley assembly to their neutral position should the tractor stall while in forward or reverse.

The present invention provides significant advantages over prior known belt drive systems especially for variable speed transmission/transaxles. First, the system includes only two belts thereby reducing repair time and replacement costs while greatly simplifying and reducing the overall costs of the entire system because of the lesser number of drive and support components which are required. The system is easily controlled by a single hand control to vary ground speed of the vehicle in which it is mounted while the engine speed is maintained at a constant rate for use in efficiently driving mower decks and other power take-off items. The arrangement is easily adaptable to different tractors having transmission/transaxle inputs and engine drive shafts located in different positions. The hand control may be held in an infinite number of positions to provide an entire range of vehicle ground speeds in forward or reverse yet be easily released by a foot or other control when the vehicle is braked to a stop allowing the system to return to its neutral or zero output setting. Additionally, the system is appropriate for use as either a pretensioned or taut belt drive system or a passive belt drive system. Further, the system may be used in either heavy or light load ranges. Also, by incorporating an appropriate disengaging assembly or clutch, the system may be released to allow pushing of the vehicle in which it is mounted when the engine is off and the belts are not rotating and to allow return of the system to neutral by rotating the belts without moving the tractor should it stall in forward or reverse.

These and other objects, advantages, purposes and features of the invention will become more apparent from a study of the following description taken in conjunction with the drawings.

BRIEF DESCRIPTION OF THE DRAWINGS

FIG. 1 is a schematic illustration of one form of the belt drive system of the present invention installed in a typical lawn and garden tractor incorporating a variable speed transaxle assembly;

FIG. 2 is a plan view of the first embodiment of the belt drive system of FIG. 1;

FIG. 3 is a side elevation of the belt drive system of FIGS. 1 and 2;

FIG. 4 is a side elevation of the belt tensioning assembly used in the belt drive system of FIGS. 1–3;

FIG. 5 is a side sectional elevation of the belt tensioning assembly taken along line V—V of FIG. 4;

FIG. 6 is a side elevation of the variable diameter pulley and pivot arm assembly used in the belt drive system of FIGS. 1–3;

FIG. 7 is a fragmentary side elevation of the hand control positioning assembly for pivoting the variable diameter pulley and pivot arm assembly in the belt drive system of FIGS. 1–3;

FIG. 8 is a sectional plan view of the hand control positioning assembly taken along line VIII—VIII of FIG. 7;

FIG. 9 is a fragmentary end elevation of the hand control positioning assembly taken along line IX—IX of FIG. 7;

FIG. 10 is a plan view of a second embodiment of the belt drive system of the present invention;

FIG. 11 is a side elevation of the belt drive system of FIG. 10;

FIG. 12 is a schematic illustration of the belt drive system of FIGS. 1–3 when arranged to provide forward output speed from the transmission/transaxle assembly;

FIG. 13 is a schematic illustration of the belt drive system of FIGS. 1–3 when arranged to provide reverse output from the transmission/transaxle assembly;

FIG. 14 is a schematic illustration of the belt drive system of FIGS. 10 and 11 when arranged to provide forward output from the transmission/transaxle assembly; and FIG. 15 is a schematic illustration of the belt drive system of FIGS. 10 and 11 when arranged to provide reverse output from the transmission/transaxle assembly.

DESCRIPTION OF THE PREFERRED EMBODIMENTS

Referring now to the drawings in greater detail, FIGS. 1–3 illustrate a first embodiment 30 of the belt drive system of the present invention. Belt drive system 30 is adapted for use with lawn and garden tractors such as that shown at 10 in FIG. 1 or other small vehicles of the type including variable speed transmission/transaxle assemblies like that at 12 in FIG. 1. Tractor 10 typically includes an internal combustion engine 14, an engine drive shaft 16 having a pair of drive pulleys 18, 20 spaced therealong. Drive pulley 18 is adapted to engage the primary drive belt 32 for belt system 30 while drive pulley 20 engages a mower deck drive belt 22 mounted around pulley 20 and a mower deck drive pulley 24 on mower deck 26. As explained more fully below, primary drive belt 32 engages a series of belt pulleys and extends rearwardly into driving engagement with one variable diameter pulley on variable pulley assembly 120 and a driven pulley 34 on one of the rotatable input shafts 13 of transaxle 12. A second drive belt 36 is mounted around a second pulley on variable pulley assembly 120 and a second driven pulley 38 mounted on the second of the two input shafts 15 of transaxle 12.

Preferably, variable speed transmission/transaxle assembly 12 is of the type disclosed in co-pending, commonly assigned U.S. patent application Ser. No.

06/759,679 filed July 29, 1985 entitled VARIABLE SPEED TRANSAXLE ASSEMBLY, invented by Roland L. von Kaler and Rocky H. Page, now U.S. Pat. No. 4,726,206, the disclosure of which is hereby incorporated by reference herein. Transmission/transaxle assembly 12 incorporates a planetary gearing assembly requiring two rotational drive inputs through shafts 13 and 15 as mentioned above. The drive inputs 13, 15 continuously rotate various parts of the planetary gearing and, depending on their relative rotational speed, produce a rotational output at axles 17, 19 on transaxle assembly 12 which is either forward, reverse or zero output or neutral. Variation in rotational output speed of axles 17, 19 is accomplished by varying the rotational speed of one of the drive inputs, for example shaft 15, while the remaining rotational drive input shaft 13 is rotated at a constant speed. Accordingly, since both drive inputs 13, 15 are continuously rotated during use of transaxle assembly 12, belt drive system 30 is designed to constantly rotate pulleys 34 and 38. Primary belt 32 is rotated at a constant rotational speed by engine drive shaft 16 and drive pulley 18. The rotational speed of secondary drive belt 36 and pulley 38 is variable and adjustable by means of a hand control assembly 140 (FIGS. 2 and 7-9) which allows adjustment to variable diameter pulley assembly 120 as explained more fully below. Such control varies the output speed of axles 17, 19 through forward, reverse and neutral and thus the ground speed of tractor 10 on wheels 21, 23.

Referring now to FIGS. 2 and 3, primary and secondary drive belts 32, 36 are conventional V belts used for various types of drive mechanisms and are typically formed from rubber or a rubber composition including flexible reinforcing cords extending longitudinally therealong. Belts 32, 36, although stretching slightly when loaded, are generally nonstretchable except for minor amounts and are formed in endless loops of the desired size. Belt 32 is mounted in a closed path beginning at engine drive pulley 18. Belt segment 32a extends around direction changing idler pulley 42 rotatably mounted on generally vertical support shaft 44 affixed to tractor frame 25 and extends on to variable diameter pulley assembly 120. The next segment 32b of belt 32 is doubled back upon itself to extend around belt tensioning assembly 50 which, as described below, pretensions both belt 32 and belt 36 in system 30 to remove all slack and maintain all segments of the belt under a predetermined load designed to provide proper frictional engagement with all drive and driven pulleys along both belts. Belt segment 32b extends to first drive input pulley 34 from which it extends onto belt segment 32c to directional idler pulley 46 mounted on support shaft 48 supported on frame 25 and back to engine drive pulley 18.

As shown in FIGS. 2-5, belt tensioning assembly 50 includes a pivot arm 52 including a top pivot bar 54 and a downwardly extending, bent, brace arm 56 each having a support aperture extending therethrough in alignment with one another. A pivot shaft 58 extends through those aligned apertures and through corresponding apertures in flanges 61, 63 of a U-shaped support bracket 60 bolted to tractor frame 25. Shaft 58 is held in place by cotter keys 62 extending through transverse fastening holes at the ends of shaft 58 and washers 64 fitted over the ends of shaft 58 between cotter keys 62 and the exterior surfaces of bars 54, 56.

Mounted at the outer end of bar 54 is a belt pulley 66 rotatably mounted on vertical bolt 68. Unlike the remainder of the belt pulleys in drive belt system 30, pulley 66 has a generally rectangular belt engaging channel 70 since it engages the wider, normally exterior surface of belt 32 as it doubles back around pulley 66 in segment 32b between variable diameter pulley assembly 120 and first input or driven pulley 34 on transaxle 12. In order to control the pivotal movement of arm 52 with pulley 66 toward and away from belt 32, a stop assembly 72 (FIGS. 2-4) is secured to bolt 68 at the outer end of arm 52. Stop assembly 72 includes a pair of spaced, vertically aligned stop bars 74, 76 having apertures telescoped over the shaft of bolt 68 on either side of pulley 66 adjacent spacing washers 67. A vertical pivot shaft 78 is mounted through aligned apertures at the opposite ends of stop arms 74, 76 and receives a pivot collar 80 telescoped thereover between bars 74 and 76 such that it spaces the ends of bars 74, 76 apart. A threaded socket 82 is welded to extend radially outwardly from the side of pivot collar 80 and includes an outwardly opening threaded aperture receiving elongated bolt 84 which slidably extends through an aperture in an L-shaped stop flange 86. Flange 86 is secured by bolt 88 and angle 90 to tractor frame 25 as shown in FIG. 4. A coil spring 92 is mounted between the lower flange of bracket 86 and pivot collar 80 such that arms 52, 74 and 76 and pulley 66 are biased against the doubled back segment 32b of belt 32 in a counterclockwise direction as shown in FIG. 2. The combined length of socket 82 and bolt 84 is adjustable by threading bolt 84 into the threaded aperture in socket 82 and tightening securing bolt 85 against the outer end of socket 82 to hold the bolt in such position. Since bolt 84 is slidably mounted in bracket 86, and socket 82 and bolt 84 have a maximum length ending with the head of bolt 84, it will be understood that the head of bolt 84 prevents arm 52 from pivoting clockwise thereby preventing loosening or slack build-up in belt 32. However, arm 52 can pivot in the counterclockwise direction should belt 32 stretch or include any slack since bolt 84 slides in bracket 86. Moreover, coil spring 92 constantly urges arm 52 in a counterclockwise direction to tension and take up slack in belt 32.

As is shown in FIGS. 2 and 3, drive belt system 30 is a pretensioned system in which belt tensioning assembly 50 is preset to place a predetermined tension load removing slack from all segments 32a, b and c of belt 32 and from belt segments 36a and 36b by shortening the combined length of socket 82 and bolt 84 appropriately. This occurs because belt 32 is stretched against variable pulley assembly 120 which is pulled against belt 36. Such a pretensioned system eliminates the need for including any biased take-up pulleys at other places along the length of either belt although other pulleys such as directional idlers 42, 46 may be used to direct the belt around various objects mounted on tractor frame 25.

As noted above, secondary drive belt 36 extends around second driven input pulley 38 and a portion of variable diameter pulley assembly 120 which is also engaged at another portion by primary drive belt 32. Variable diameter pulley assembly 80 enables the rotational speed of secondary drive belt 36 to be changed even though primary drive belt 32 is rotated at a constant rotational speed by engine drive pulley 18. Thus, the rotational speed of input pulley 38 may be changed using variator 120 without changing the speed of engine 14, drive shaft 16 or drive pulleys 18 or 20. Maintenance of such constant engine speed enables more efficient mowing since the mower blades in deck 26 are rotated at a constant speed by drive pulley 20 and mower deck pulley 24 through belt 22.

As is best seen in FIGS. 2, 3 and 6, variable pulley or variator assembly 120 includes a pair of vertically aligned support arms 102, 104 including arm segments 102a, 102b and 104a, 104b which are secured together by vertical shaft 106 and bolts 108 such that segments 102a, 104a may be adjusted for length and pivotal position with respect to segments 102b, 104b. The outer ends of support arms 102, 104 are spaced apart by a bushing or collar 112 telescoped over and fitted between those arms on securing shaft 110 receiving bolts on the exterior sides of arms 102, 104. A similar bushing 107 is fitted between the inner ends of arms 102a, 104a on shaft 106 to space the inner ends of the arms apart.

Support arms 102, 104 are pivotally mounted on a U-shaped bracket 114 bolted to tractor frame 25. A vertical pivot shaft 116 is telescoped through aligned vertical apertures at the inner ends of arms 102, 104. Spacers 118 are fitted between arms 102, 104 and the outwardly extending ends of bracket 114.

A pair of vertically aligned, commonly rotatable V belt pulleys 121, 122 are rotatably mounted on support shaft 124 extending between a pair of apertures through arms 102, 104 intermediate shafts 106, 110. Pulleys 121, 122 are formed by conical pulley segments 126a, 126b which are immediately adjacent spacing washers 125 on shaft 124 and a central, double conically shaped pulley segment 128 which engages the belts in both pulley sections and is slidable vertically along shaft 124 between pulley segments 126a, 126b. As will be apparent from FIG. 6, vertical movement of pulley segment 128 away from pulley segment 126a allows a V belt wrapped around pulley 121 to move closer to shaft 124 since the V-shaped gap between segments 126a and 128 is widened thereby decreasing the contact diameter of the V pulley 121. Simultaneously, the contact diameter of pulley 122 is correspondingly increased by the same amount since pulley segment 128 moves closer to pulley segment 126b by the same distance. Regardless of the contact diameter and thus the rotational speed of the two belts, however, pulley segment 128 will rotate at a common rotational speed. Accordingly, it will be understood that variator assembly 120 includes two commonly rotated pulleys 121, 122 whose belt contact diameters are increased and decreased correspondingly or vice versa by movement of common pulley segment 128.

In order to change the diameters of pulleys 121, 122 by moving pulley segment 128, the pivotal position of the variator assembly 120 is changed by pivoting support arms 102, 104 about shaft 116 using a manual, hand operated positioning assembly 140 which enables control of the transaxle output speed and thus the ground speed and direction of the tractor 10. As shown in FIGS. 2 and 7-9, the manually controlled positioning assembly 140 includes a support tube 142 having a square support plate 144 welded to its exterior and bolted to the side of tractor frame 25 (FIGS. 2 and 9). A cylindrical shaft 146 is rotatably mounted within tube 142 and extends from either end of the tube. A handle mounting socket 148 is bolted to the outer end of shaft 146 and includes a radially extending manual control handle 150 for operation by a tractor operator. Handle 150 is movable between forward, neutral and reverse positions (FIG. 3). At a position slightly spaced from the inner end of tube 142, an elongated pivot arm 152 is welded to the exterior of shaft 146 such that it generally extends upwardly parallel to plate 144 and above the upper edge of the plate as shown in FIG. 7. A brake disc 154 is fixed to the inner most end of shaft 146 and is used to maintain the rotational position of shaft 146 as set by handle 150 as explained hereinafter.

Adjacent the upper end of pivot arm 152 is an inwardly extending, cylindrical stud 156 over which is telescoped a pivot collar 158 having a threaded stud 160 extending radially outwardly therefrom. Pivot collar 158 is retained on stud 156 by a cotter key 162 (FIGS. 7 and 8). A universal linkage 164 (FIG. 2) including a pair of universal joints 166, 168 and a link 170 extends between stud 160 on collar 158 and a stud 172 welded or otherwise secured to collar 112 as shown in FIGS. 2, 3 and 7. Accordingly, pivot arm 152 and universal linkage 164 are pivoted through an arc of approximately 90 to 100 degrees at the upper side of plate 144 by rotating shaft 146 via handle 150. Such pivotal movement causes the corresponding pivotal movement of support arms 102, 104 of variator assembly 120 such that the variator is moved from a fast forward position (shown in solid in FIG. 2) through an arc of approximately 20 degrees to 30 degrees to a fast reverse position (shown in phantom in FIG. 2). By changing the position of pivot arms 102, 104, V belt pulley 121 of variator assembly 120 is forced against the inner surface of V belt 32 thereby pushing pulley segment 128 upwardly toward pulley segment 126a to cause the diameter contact position of belt 32 on pulley 122 to decrease. Such movement correspondingly increases the contact diameter of upper pulley 121 via the upward movement of pulley segment 128. Because of the decrease in diameter of contact of pulley 122 with drive belt 32, variator assembly 120 is rotated faster via the constant rotational speed of belt 32 causing a consequent increase in rotational speed of secondary belt 36 and second driven pulley 38 and second input shaft 15 for transaxle 12. As explained in application Ser. No. 06/579,617 incorporated herein by reference above, such variation in input speeds for the variable input shaft on the transaxle assembly results in a corresponding change or decrease in the output speed for axles 17, 19 and thus a change in the ground speed of tractor 10. A preferred variator assembly 120 is the "Peerless-May Variator" obtained from Peerless Gear and Machine Division, Tecumseh Products Company, Clinton, Mich.

Because of the nature of the planetary gear type variable speed transmission/transaxle assembly 12 which is preferably used with belt system 30, the natural tendency of variator assembly 120 is to return to the neutral or zero output position for transaxle 12, i.e., the centered position of arms 102, 104 in FIG. 2. In order to counteract such tendency, a biasing coil spring 151 is secured between handle 150 and a fixed portion of the tractor (FIG. 2) and a brake assembly 180 (FIGS. 7-9) is provided for engagement with brake disc 154 on the end of shaft 146. Brake assembly 180 includes a support arm 182 bolted to tractor frame 25 and supporting at its lower end a brake caliper assembly 184 having brake pads 186, 188 (FIG. 8) engaging opposite sides of brake disc 154. Brake pads 186, 188 are biased to normally engage disc 154. Disengagement of brake pads 186, 188 with disc 154 is accomplished by rotating brake arm 190 mounted on pivot 192 on caliper assembly 184 in a clockwise direction. As shown in FIG. 7, arm 190 is normally biased in a counterclockwise direction to apply clamping pressure to brake pads 186, 188 on disc 154 by a pair of opposed coil springs 196, 198 engaging the free end of arm 190. Spring 196 extends between arm 190 and the end of a control rod 200 extending to a foot pedal or other control on tractor 10 which preferably is also connected to the vehicle brakes (not shown). Coil spring 198 is connected between arm 190 and a bracket 194 or other fixed element on frame 25 or another portion of tractor 10.

Brake pads 186, 188 are normally applied to disc 154 to hold shaft 146 and handle 150 in a desired rotational position as set by the tractor operator. However, when the tractor operator applies the vehicle brakes to stop the vehicle, control rod 200 is pulled to the left in FIG. 7 causing a consequent shifting of spring 196 to the left and rotation of brake arm 190 in a clockwise direction. This releases brake pads 186, 188 and allows shaft 146, pivot arm 152, universal linkage 164 and variator assembly 120 to "float" and return to the neutral position thereby avoiding stalling of engine 14 but allowing belts 32, 36 to continuously rotate input pulleys 34, 38 and shafts 13, 15 while producing zero output to axles 17, 19.

As will be understood from FIGS. 1-3, primary and secondary belts 32, 36 are always engaged with their drive and driven pulleys. Since the gearing in the planetary type variable speed transmission/transaxle assembly 12 is also constantly engaged, movement of tractor 10 when engine 14 is not running is extremely difficult due to the resistance of the compression in engine 14. In order to allow convenient manual movement of tractor 10 even though belt drive system 30 remains engaged with all driven and drive pulleys, a clutch mechanism 210 is provided as shown in FIG. 3. Although a dynamic friction clutch could also be used, clutch mechanism 210 is a dog type clutch incorporated on transaxle 12 to allow disengagement of input shaft 13 from pulley 34. As shown in representative manner in FIG. 3, a hand lever 212 is connected to pivot shaft 214 to remove a key or dog normally affixing pulley 34 to shaft 13 to disengage the transaxle gearing from belt drive system 30 and allow the tractor to be pushed o moved without resistance. Such movement will rotate axles 17, 19 and shaft 13. However, since pulley 34 is disengaged from shaft 13, none of belt 32, variable pulley assembly 120, belt 36, shaft 15 and pulley 38 are rotated. Consequently, resistance from engine 14 is absent since belt 32 does not turn against pulley 18 or the compression of engine 14. The proper tension in both belts 32 and 36 is unaffected by such disengagement.

Positioning of clutch 210 to disengage shaft 13 from pulley 34 also enables return of belts 32, 36 to their neutral positions if the tractor stalls while in forward or reverse. Since the friction acting on variator pulley assembly 120 is too great to allow its pivotal movement on shaft 116 unless belts 32, 36 are rotating, clutch 210 may be disengaged if the tractor stalls in other than neutral to allow rotation of the belts and pivoting of arm 102 back to its neutral position without turning axles 17, 19. Thus with the vehicle brake on and clutch 210 disengaged, engine 14 turns belt 32 and pulley 34. Belt 36 is thus also rotated but causing no effect in transaxle 12 since shaft 13 is disengaged from pulley 34. However, since both belts are rotating, variable pulley assembly 120 can be returned to its neutral position. Clutch 210 can be reengaged at that position since the speeds of shaft 13 and pulley 34 are synchronized at that position.

Of course, other manual controls besides hand levers, such as a foot pedal, could be used to disengage clutch mechanism 210. Further, the clutch mechanism may be located at other positions in the system such as between input shaft 15 and driven pulley 38 or between drive pulley 18 and engine drive shaft 16 or totally within and incorporated by the transaxle assembly 12.

Referring now to FIGS. 10 and 11, an alternative embodiment 220 of the two belt drive system is illustrated. Belt drive system 220 is of the passive type which is not pretensioned or tightened to the same degree as is belt drive 30. Rather, a series of idler pulleys, rollers, wheels or other rotatable members is incorporated to take up slack at various portions of segments of the primary and secondary drive belts such that the entire system operates under a lesser tension providing less wear on bearing surfaces and, consequently, longer life especially when used under higher loads. Prime numerals in belt system 220 identical to the same numerals in belt system 30 indicate like parts.

Belt drive system 220 incorporates a heavy duty variable speed, planetary gearing transmission, transaxle 12' having rotating axles 17', 19'. A primary drive belt 32' extends in a closed loop from engine drive pulley 18' around a secondary belt tensioning assembly 230 engaging belt segment 32a', around the lower pulley 122' of variable diameter pulley assembly or variator 120' mounted for pivotal movement on pivot arms 102', 104' as controlled by manual positioning assembly 140'. Belt 32' extends from variable pulley assembly 120' with belt segment 32b' around primary belt tensioning device 50' in doubled back fashion such that the exterior surface of belt 32' engages pulley 66' on tensioner 50' in the same fashion as in belt drive 30. The primary drive belt then extends around constant rotational speed input pulley 34' mounted on input shaft 13' of transaxle 12' to belt segment 32c' extending rectilinearly to drive pulley 18'.

A secondary drive belt 36' is mounted about the upper pulley 121' of variable pulley assembly 120' and second input pulley 38' mounted on input shaft 15' of transaxle 12'. Belt drive 220 is tensioned in a preset manner to a lesser degree than belt drive 30 with belt tensioner 50' but sufficiently to remove initial slack from both belts 32', 36' of the system. Tensioner 50' also removes additional slack from belt segment 32b' at various times during operation of the system. Pivotal movement of support arms 102', 104' and thus variator 120' through an arc shown in FIG. 10 will cause corresponding increase and decrease in the diameters of pulleys 121', 122' to change the rotational speed of secondary drive belt 36' even though primary drive belt 32' is rotated at a constant rotational speed by engine drive pulley 18'.

Since primary drive belt 32' is not pretensioned to the same degree as is belt 32 in system 30, additional slack take-up tensioning devices are included in belt system 220, one engaging primary drive belt segment 32a' and the other engaging both segments 36a' and 36b' of secondary drive belt 36'.

As shown in FIGS. 10 and 11, secondary belt tensioning assembly 230 includes fixed support bracket 232 fastened to tractor frame 25' or another fixed portion of the tractor in which the system is mounted and a pivot arm 234 pivotally mounted with respect to bracket 232 on pivot shaft 235. An idler pulley, roller, wheel or other member 236 is rotatably mounted under pivot arm 234 (FIG. 11). Pulley 236 includes a rectangular channel 238 engaging the exterior surface of V belt segment 32a'. Pivot arm 234 and pulley 236 are biased inwardly against belt segment 32a' by coil spring 240 extending between pivot arm 234 and a bracket or other element 242 fixed to the tractor to take up slack in belt segment 32a' and increase the tension on the belt as explained below. The strength of spring 240 is not sufficient to tighten the entire primary drive belt, however.

In order to take up slack in the secondary drive belt 36', a third belt tensioning device 250 is mounted on upper variator pivot arm 102' as shown in FIGS. 10 and 11. Tensioning assembly 250 includes a pair of roller support arms 252, 254 arranged in a V shape and commonly pivotally mounted on a pivot shaft 256 secured to upper variator pivot arm 102' as shown in FIG. 10. A pair of cylindrical idler rollers or wheels 258 rotatably mounted on downwardly extending shafts 260, one at the end of each support arm 252, 254, engage the exterior surface of secondary drive belt 36' at segments 36a' and 36b', respectively. Idler rollers or wheels 258 are biased into engagement with the V belt segments by a coil spring 262 engaging each support arm 252, 254 near its outer end to bias the arms toward one another. Accordingly, during slack periods for secondary drive belt 36', tensioning assembly 250 tends to pinch the belt segments 36a' and 36b' toward one another to take up slack in that belt.

Apart from the above differences and the lesser tension applied through belts 32' and 36', belt drive system 220 is operated in substantially the same manner as is belt drive system 30 to obtain variation in the transaxle output and ground speed of the tractor while operating the engine 14 and drive pulley 18 at a constant preset rotational speed. Transaxle output and ground speed are controlled manually by the tractor operator using manual control handle 150' and variator positioning assembly 140' in the same manner as in belt drive system 30.

As will now be understood from FIGS. 12–15, control of the positioning assembly 140 or 140' to change output directions from forward through zero output or neutral to reverse creates different tensions at different times on the various segments of the primary and secondary drive belts 32, 36 and 32', 36'. As shown in FIG. 12, when belt drive system 30 is operated to produce a forward output speed, engine pulley 18 is a driver pulley, input pulley 34 is a driven pulley, while pulleys 42, 46 and 66 are idler pulleys or wheels. Engagement of belt 32 with pulley 122 causes pulley 122 to act as a driver to drive while constant speed input pulley 34 is a driven pulley. Thus, belt segments 32a and 32c are tight while belt segment 32b is slack. At the same time torque acting from the transmission/transaxle through the variable speed input shaft and pulley 38 causes pulley 38 to act as a drive pulley while pulley 121 is driven. Belt segment 36a is tight while segment 36b is slack.

However, when positioning assembly 140 is prulled back with handle 150 to cause reverse output from transaxle 12, the tension on the various belt segments in belt system 30 changes accordingly. As shown in FIG. 13, for the reverse mode, while engine pulley 18 continues as a drive pulley, making belt segment 32c taut, first input pulley 34 is also a drive pulley while variable pulley 122 is a driven pulley due to torque transmitted back through transaxle 12. This causes belt segment 32a to be in slack condition, which slack is taken up by pulley 66 on assembly 50. Segment 32b is in taut condition. Further, the second variable pulley 121 acts as a driver in the reverse mode, while second input pulley 38 is a variable driven pulley causing segment 36a to be slack and 36b to be taut. Due to the significant pretensioning of the belt system 30, however, additional idler pulleys are not required for the slack segments in the forward and reverse modes for belt drive 30.

With respect to alternative belt drive system 220, which is a passive system without significant pretensioning, in the forward mode, engine drive pulley 18' is a driver pulley along with pulley 122', while first input 34' is a driven pulley. This causes belt segments 32a' and 32c' to be taut while belt segment 32b' is slack. Such slack is taken up by tensioning assembly 50' and pulley 66'. Similarly, pulley 121' is a driven pulley with second input pulley 38' being a variable speed driver pulley due to the torque in the transaxle. Thus, belt segment 36a' is taut while belt segment 36b' is slack and any looseness is taken up by idler assembly 250.

As shown in FIG. 15, when belt drive system 220 is in its reverse mode, engine pulley 18' remains a driver pulley as is first input pulley 34' while variable pulley 122' is a driven pulley. Belt segments 32c' and 32b' are thus taut while segment 32a' is slack with any slack being taken up by belt tensioning assembly 230 and pulley 236. Further, second input pulley 38' is driven by variable speed pulley 121'. Thus, belt segment 36a' is slack while belt segment 36b' is taut and any slack being taken up by tensioning assembly 250 on the secondary drive belt.

While several forms of the invention have been shown and described, other forms will now be apparent to those skilled in the art. Therefore, it will be understood that the embodiments shown in the drawings and descrited above are merely for illustrative purposes, and are not intended to limit the scope of the invention which is defined by the claims which follow.

The embodiments of the invention in which an exclusive property or privilege is claimed are defined as follows:

1. A belt drive system for use with a variable speed vehicular transmission/transaxle assembly of the type having one input shaft adapted to be driven, at a fixed rotational speed and a second input shaft adapted to be driven at. a rotational speed which may be varied to change the output speed of said transmission/transaxle, said system comprising:

a driving belt pulley adapted to be mounted on an engine drive shaft;

a first driven belt pulley adapted to be mounted on the first input shaft for rotation in a predetermined rotational direction;

a second driven belt pulley adapted to be mounted on the second input shaft ror rotation in said predetermined rotational direction;

a variator pulley assembly including a pair of rotatably mounted belt pulleys and means for changing the belt receiving diameter of one of said variator pulleys in response to a change in the belt receiving diameter of the other of said variator pulleys;

a first drive belt mounted on said driving pulley, said first driven pulley and one of pulleys in said variator pulley assembly for rotation of said first driven pulley in said predetermined direction;

a second drive belt mounted on said second driven pulley and said other pulley of said variator pulley assembly also for rotation in said predetermined direction; and positioning means for changing the position of said variator pulley assembly whereby when said first driven pulley is driven in said predetermined rotational direction at a predetermined rotational speed with said first drive belt and driving pulley, said second driven pulley will be rotated in said predetermined rotational direction at a rotational speed which is adjustable with said positioning means.

2. The belt drive system of claim 1 including first belt tensioning means for maintaining said first and second drive belts at a predetermined tension.

3. The belt drive system of claim 2 wherein said first belt tensioning means engages a first segment of said first drive belt extending between said one pulley of said variator pulley assembly and said first driven pulley.

4. The belt drive system, of claim 3 wherein said first belt tensioning means is located in the area between said variator pulley assembly and said driving pulley; said first segment of said first drive belt doubling back around said first belt tensioning means after leaving said variator pulley assembly and before reaching said first driven pulley.

5. The belt drive system of claim 4 wherein said first belt tensioning means includes a rotatable idler belt pulley and retaining means for holding said idler pulley in a predetermined position against said first drive belt.

6. The belt drive system of claim 5 wherein said retaining means includes a pivot arm, means for rotatably mounting said idler belt pulley on said pivot arm, means for pivotally mounting said pivot arm adjacent said belt drive system for movement in a first pivotal direction to decrease slack in said first drive belt and in a second pivotal direction to increase slack in said first drive belt, and adjustable stop means for preventing movement of said pivot arm in said second pivotal direction.

7. The belt drive system of claim 6 wherein said adjustable stop means includes a flange adapted to be mounted adjacent said system, a rigid rod slidably mounted in said flange, means for securing one end of said rod to said pivot arm, a stop on the other end of said rod for engaging said flange to limit pivotal movement of said arm in said second pivotal direction, means for adjusting the length of said rod, and biasing means for urging said pivot arm and said rod in said first pivotal direction.

8. The belt drive system of claim 2 including second belt tensioning means for helping to maintain said first drive belt at a predetermined tension.

9. The belt drive system of claim 8 wherein said second belt tensioning means engages a second segment of said first drive belt extending between said driving pulley and said one pulley of said variator pulley assembly.

10. The belt drive system of claim 9 wherein said second belt tensioning means is located adjacent said first drive belt and includes a second idler belt pulley engaging the outside surface of said first drive belt, a second pivot arm, means for rotatably mounting said second idler belt pulley on said second pivot arm, means for pivotally mounting said pivot arm adjacent said system, and biasing means for urging said second idler pulley and second pivot arm against said second segment of said first drive belt to take up slack in said second segment.

11. The belt drive system of claim 8 including third belt tensioning means for helping to maintain said second drive belt at a predetermined tension.

12. The belt drive system of claim 11 wherein said third belt tensioning means includes idler means for engaging both segments of said second drive belt extending between said other belt pulley of said variator pulley assembly and said second driven pulley.

13. The belt drive system of claim 12 wherein said idler means includes a pair of pivot arms mounted for pivotal movement about a common axis on said variator pulley assembly, an idler member rotatably mounted on each of said pair of pivot arms outside said second drive belt, and biasing means for urging said idler members toward one another and against both said segments of said second drive belt.

14. The belt drive system of claim 11 wherein said first, second and third belt tensioning means each include at least one idler member engaging said respective drive belts and biasing means for biasing each of said idler members into engagement with said respective drive belts; said drive belts being mounted on said driving and driven pulleys for rotation in generally parallel planes; said respective idler members of said first, second and third belt tensioning means being generally co-planar with their respective drive belts.

15. The belt drive system of claim 2 including second drive belt tensioning means for helping to maintain said second drive belt at a predetermined tension.

16. The belt drive system of claim 1 including second drive belt tensioning means for helping to maintain said second drive belt at a predetermined tension.

17. The belt drive system of claim 2 including at least one idler pulley rotatably mounted on a pivot axis fixed adjacent and engaging said first drive belt for changing the direction of said first drive belt.

18. The belt drive system of claim 1 wherein said positioning means include a pivot arm, means for rotatably mounting said two pulleys on said pivot arm, and means for pivotally mounting said pivot arm adjacent said system for pivotal movement in a first direction to decrease the diameter of said one variator pulley and simultaneously increase the diameter of said other variator pulley, and in a second direction to increase the diameter of said one variator pulley and simultaneously decrease the diameter of said other variator pulley.

19. The belt drive system of claim 18 wherein said positioning means further include hand operated means connected to said pivot arm for pivoting said pivot arm and two variator pulleys in said first and second directions.

20. The belt drive system of claim 19 wherein said hand operated means include a shaft rotatably mounted adjacent said belt system, a lever arm fixed to and extending perpendicular to said shaft, link means pivotally connected between said lever arm and said pivot arm, and a handle extending outwardly from said shaft whereby rotation of said shaft and lever arm with said handle will move said pivot arm via said link means.

21. The belt drive system of claim 20 including means for releasably holding said shaft in a predetermined rotational position.

22. The belt drive system of claim 21 wherein said system is adapted to be mounted in a vehicle; said means for releasably holding said shaft including brake means for holding said shaft in any one of an infinite number of rotational positions and means connected to said brake means for releasing said shaft when the vehicle in which said system is mounted is stopped.

23. The belt drive system of claim 1 including means for disengaging at least one of said three driving and driven pulleys to allow rotation of an axle of said transmission/transaxle without rotation against the compression of the engine mounted for driving the first drive belt.

24. The belt drive system of claim 23 wherein said means for disengaging at least one of said pulley include a dog-type clutch.

25. A belt drive system for vehicular transmissions/transaxles comprising:
- a driving pulley adapted to be mounted on an engine drive shaft for rotation in a predetermined rotational direction;
- a first driven pulley adapted to be mounted for rotation in said predetermined rotational direction on a first input shaft on the transmissmion/transaxle;
- a second driven pulley adapted to be mounted for rotation in said predetermined rotational direction on a second input shaft on the transmission/transaxle;
- a first drive belt mounted on said drivng pulley and said first driven pulley for rotating said first driven pulley in said predetermined rotational direction;
- a second drive belt mounted on said second driven pulley;
- variable diameter pulley means engagingsaid first and second drive belts for changing the rotationa speed of said second drive belt and second driven pulley in response to a change in the diameter at which said first drive belt contacts said variable pulley means whereby when said first drive belt and first driven pulley are driven at a constant rotational speed, the rotational speed of said second drive belt and second driven pulley may be varied to change the output speed of the transmission/transaxle by changing the diameter of said variable pulley means.

26. The belt drive system of claim 25 wherein said variable diameter pulley means is a variator pulley assembly including a pair of rotatably mounted belt pulleys and means for changing the belt receiving diameter of one of said variator pulleys in response to a change in the belt receiving diameter of the other of said variator pulleys; said first drive belt being mounted on one of said variator pulleys of said variator pulley assembly; said second drive belt being mounted on the other of said variator pulleys of said variator pulley assembly.

27. The belt drive system of claim 26 including positioning means for changing the position of said variator pulley assembly whereby when said first driven pulley is driven in said predetermined rotational direction at a predetermined rotational speed with said first drive belt and driving pulley, said second driven pulley will be rotated in said predetermined rotational direction at a rotational speed which is adjustable with said positioning means.

28. The belt drive system of claim 27 wherein said positioning means include a pivot arm, means for rotatably mounting said two pulleys on said pivot arm, and means for pivotally mounting said pivot arm adjacent said system for pivotal movement in a first direction to decrease the diameter of said one variator pulley and simultaneously increase the diameter of said other variator pulley, and in a second direction to increase the diameter of said one variator pulley and simultaneously decrease the diameter of said other variator pulley.

29. The belt drive system of claim 28 wherein said positioning means further include hand operated means connected to said pivot arm for pivoting said pivot arm and two variator pulleys in said first and second directions.

30. The belt drive system of claim 29 wherein said hand operated means include a shaft rotatably mounted adjacent said belt system, a lever arm fixed to and extending perpendicular to said shaft, link means pivotally connected between said lever arm and said pivot arm, and a handle extending outwardly from said shaft whereby rotation of said shaft and lever arm with said handle will move said pivot arm via said link means.

31. The belt drive system of claim 30 including means for releasably holding said shaft in a predetermined rotational position.

32. The belt drive system of claim 25 including first belt tensioning means for maintaining said first and second drive belts at a predetermined tension.

33. The belt drive system of claim 32 including second belt tensioning means for helping to maintain said first drive belt at a predetermined tension.

34. The belt drive system of claim 33 including third belt tensioning means for helping to maintain said second drive belt at a predetermined tension.

35. The belt drive system of claim 34 wherein said first, second and third belt tensioning means each include at least one idler member engaging said respective drive belts and biasing means for biasing each of said idler members into engagement with their respective drive belts; said drive belts being mounted on said driving and driven members for rotation in generally parallel planes; said respective idler pulleys of said first, second and third belt tensioning means being generally co-planar with their respective drive belts.

36. The belt drive system of claim 25 including means for disengaging at least one of said three driving and driven pulleys to allow rotation of an axle of said transmission/transaxle without rotation against the compression of the engine mounted for driving the first drive belt.

37. In a vehicle having a support frame, an engine having a drive shaft, a variable speed transmission/transaxle assembly having at least one axle, one input shaft adapted to be driven at a fixed rotational speed and a second input shaft adapted to be driven at a rotational speed which may be varied to change the output speed of said axle, and rotational vehicle support means secured to said axle for movably supporting said vehicle, an improved belt drive system comprising:
- a driving belt pulley mounted on said engine drive shaft;
- a first driven belt pulley mounted on said first input shaft for rotation in a predetermined rotational direction;
- a second driven belt pulley mounted on said second input shaft for rotation in said predetermined rotational direction;
- a variator pulley assembly including a pair of rotatably mounted belt pulleys and means for changing the belt receiving diameter of one of said variator pulleys in response to a change in the belt receiving diameter of the other of said variator pulleys;
- a first drive belt mounted on said driving pulley, said first driven pulley and one of pulleys in said variator pulley assembly for rotating said first driven pulley in said predetermined direction;
- a second drive belt mounted on said second driven pulley and said other pulley of said variator pulley assembly for rotating said second driven pulley in said predetermined direction; and
- positioning means for changing the position of said variator pulley assembly whereby when said first driven pulley is driven in said predetermined rotational direction at a predetermined rotational speed with said first drive belt and driving pulley, said second driven pulley will be rotated in said predetermined rotational direction at a rotational speed which is adjustable with said positioning means.

38. The improved belt drive system of claim 37 wherein said positioning means include a pivot arm, means for rotatably mounting said two variator pulleys on said pivot arm, and means for pivotally mounting said pivot arm adjacent said system for pivotal movement in a first direction to decrease the diameter of said one variator pulley and simultaneously increase the diameter of said other variator pulley, and in a second direction to increase the diameter of said one variator pulley and simultaneously decrease the diameter of said other variator pulley.

39. The improved belt drive system of claim 38 wherein said positioning means further include hand operated means connected to said pivot arm for pivoting said pivot arm and two variator pulleys in said first and second directions.

40. The improved belt drive system of claim 37 including first belt tensioning means for maintaining said first and second drive belts at a predetermined tension.

41. The improved belt drive system of claim 40 including second belt tensioning means for helping to maintain said first drive belt at a predetermined tension.

42. The improved belt drive system of claim 41 including third belt tensioning means for helping to maintain said second drive belt at a predetermined tersion.

43. The improved belt drive system of claim 37 including means for disengaging at least one of said three driving and driven pulleys to allow rotation of said axle and rotational vehicle support means such that said vehicle can be pushed without operating said engine and said engine and drive belts can be operated to return said positioning means to a neutral position without moving the vehicle.

* * * * *

UNITED STATES PATENT AND TRADEMARK OFFICE
CERTIFICATE OF CORRECTION

PATENT NO. : 4,768,997

DATED : September 6, 1988

INVENTOR(S) : Rocky H. Page and Edward J. Koscho, deceased

It is certified that error appears in the above-identified patent and that said Letters Patent is hereby corrected as shown below:

Column 5, line 4:

"No. 4,726,206" should be --No. 4,726,256--.

Column 9, line 41:

"o" should be --or--.

Column 11, line 53:

"prulled" should be --pulled--.

Column 12, line 30:

"descrited" should be --described--.

Column 12, claim 1, line 49:

"ror" should be --for--.

Column 15, claim 25, line 18:

"engagingsaid" should be --engaging said--.

Column 15, claim 25, line 19:

"rotationa" should be --rotational--.

UNITED STATES PATENT AND TRADEMARK OFFICE
CERTIFICATE OF CORRECTION

PATENT NO. : 4,768,997

DATED : September 6, 1988

INVENTOR(S) : Rocky H. Page and Edward J. Koscho, deceased

It is certified that error appears in the above-identified patent and that said Letters Patent is hereby corrected as shown below:

Column 18, claim 42, line 9:

"tersion" should be --tension--.

Signed and Sealed this

Twenty-fifth Day of July, 1989

Attest:

DONALD J. QUIGG

Attesting Officer

Commissioner of Patents and Trademarks